(12) United States Patent
Soares de Resende et al.

(10) Patent No.: US 12,206,766 B2
(45) Date of Patent: Jan. 21, 2025

(54) INTERNET OF THINGS SECURITY WITH MULTI-PARTY COMPUTATION (MPC)

(71) Applicant: INESC TEC Instituto de Engenharia de Sistemas e Computadores, Tecnologia E Ciência, Oporto (PT)

(72) Inventors: João Miguel Maia Soares de Resende, Oporto (PT); Rolando da Silva Martins, Oporto (PT); Luís Filipe Coelho Antunes, Oporto (PT); Patrícia Raquel Vieira Sousa, Oporto (PT)

(73) Assignees: INESC TEC—INSTITUTO DE ENGENHARIA DESISTEMAS E COMPUTADORES, TECNOLOGIA E CIÊNCIA, Oporto (PT); U.PORTO—UNIVERSIDADE DO PORTO, Oporto (PT)

( * ) Notice: Subject to any disclaimer, the term of this patent is extended or adjusted under 35 U.S.C. 154(b) by 0 days.

(21) Appl. No.: 18/099,156

(22) Filed: Jan. 19, 2023

(65) Prior Publication Data

US 2023/0155816 A1 May 18, 2023

Related U.S. Application Data

(63) Continuation of application No. 17/055,671, filed as application No. PCT/EP2019/062713 on May 16, 2019, now abandoned.

(30) Foreign Application Priority Data

May 16, 2018 (PT) .......................... 20181000034529
May 25, 2018 (EP) ..................................... 18174412

(51) Int. Cl.
*H04L 9/08* (2006.01)
*G06F 7/58* (2006.01)
(Continued)

(52) U.S. Cl.
CPC ............ *H04L 9/0841* (2013.01); *G16Y 30/10* (2020.01); *H04L 63/0435* (2013.01);
(Continued)

(58) Field of Classification Search
CPC . H04L 9/0841; H04L 63/0435; H04L 63/061; H04L 63/0869; H04L 67/12;
(Continued)

(56) References Cited

U.S. PATENT DOCUMENTS 7,730,309 B2 6/2010 Zimmermann
9,467,425 B2 * 10/2016 Epp ..................... H04L 63/0428
(Continued)

FOREIGN PATENT DOCUMENTS

| JP | 2005099980 A | 4/2005 |
| JP | 2005354556 A | 12/2005 |
| JP | 2006332903 A | 12/2006 |

OTHER PUBLICATIONS

Zimmerman ZFONE Project, a Johnston P, et al "ZRTP: Media Path Key Agreement for Unicast Secure RTP; RCF6189.txt", ZRPT: Media Path Key Agreement for Unicast Secure RTP; RFC6189. TXT, Internet Engineering Task Force, IETF:Standard, Internet Society (ISOC) 4, Rue Des Falaises Ch- 1205 Geneva, Switzerland, Apr. 11, 2011, pp. 1-115.
(Continued)

*Primary Examiner* — Mohammed Waliullah
(74) *Attorney, Agent, or Firm* — 24IP Law Group USA, PLLC; Timothy R DeWitt

(57) ABSTRACT

A method and device for establishing a communication along a communications channel between a first device (200A) and a second device (200B) is disclosed. The method comprises mutually discovering the first device (200A) and the second device (200B), validating (F5, F6, F7) the communications channel between the first device (200A)
(Continued)

and the second device (200B) by exchange of data messages, exchanging a secret between the first device (200A) and the second device (200B) and then exchanging encrypted messages along the communications channel.

11 Claims, 4 Drawing Sheets

(51) Int. Cl.
*G16Y 30/10* (2020.01)
*H04L 9/40* (2022.01)
*H04L 67/12* (2022.01)

(52) U.S. Cl.
CPC ........ *H04L 63/061* (2013.01); *H04L 63/0869* (2013.01); *H04L 67/12* (2013.01); *G06F 7/582* (2013.01); *H04L 2209/46* (2013.01); *H04L 2209/84* (2013.01)

(58) Field of Classification Search
CPC ............. H04L 2209/46; H04L 2209/84; H04L 67/125; H04L 63/0428; G16Y 30/10; G06F 7/582; H04W 12/00; H04W 4/00; H04W 4/30; H04W 12/50; H04W 4/70; H04W 84/18
See application file for complete search history.

(56) References Cited

U.S. PATENT DOCUMENTS

| | | | | |
|---|---|---|---|---|
| 2005/0251680 | A1* | 11/2005 | Brown | H04W 12/069 713/171 |
| 2007/0157026 | A1* | 7/2007 | Zimmermann | H04M 7/0078 713/171 |
| 2015/0288667 | A1* | 10/2015 | Alder | H04L 63/061 713/171 |

OTHER PUBLICATIONS

Ming Li, et al: "Group Device Pairing based Secure Sensor Association and Key Management for Body Area Networks", INFOCOM, 2010 Proceedings IEEE, Piscataway, NJ, USA, Mar. 14, 2010, pp. 1-9.
Hu Tao, et al: "Preference-Based Privacy Protection Mechanism for the Internet of Things", Information Science and Engineering (ISISE), 2010 International Symposium on, IEEE, Dec. 24, 2010, pp. 531-534.
Zhen Yan et al: "A survey on trust management for Internet of Things", Journal of Network and Computer Applications, vol. 42, Jun. 1, 2014, pp. 120-134.
Yang, Yuchen, et al. "A Survey on Security and Privacy Issues in Internet-of-Things." IEEE Internet of Things Journal (2017).
H. Sundmaeker, P. Guillemin, P. Friess and S. Woelffle, "Vision and Challenges for Realising the Internet of Things," Cluster of European Research Projects on the Internet of Things, 2010.
Aman, Muhammad, Kee Chaing Chua, and Biplab Sikdar. "Mutual Authentication in IoT Systems using Physical Unclonable Functions." IEEE Internet of Things Journal (2017).
Umar, Amjad. Information Security and Auditing in the Digital Age. nge solutions, inc, 2003.
Hao, Feng, and Peter YA Ryan. "Password authenticated key exchange by juggling." International Workshop on Security Protocols. Springer Berlin Heidelberg, 2008.
Ancrenon, Jean, Marjan Å krobot, and Qiang Tang. "Two More Efficient Variants of the J-PAKE Protocol." International Conference on Applied Cryptography and Network Security. Springer International Publishing, 2016.
Hao, Feng. "J-pake: Password authenticated key exchange by juggling." (2016).
Hao, Feng., Ed. "Schnorr NIZK Proof: Non-interactive Zero Knowledge Proof for Discrete Logarithm" (2013).
Seo, Dong Hwi, and P. Sweeney. "Simple authenticated key agreement algorithm." Electronics Letters 35.13 (1999): 1073-1074.
Goldreich, Oded. "Secure multi-party computation." Manuscript. Preliminary version (1998): 86-97.
Toorani, Mohsen. "Security analysis of J-PAKE." Computers and Communication (ISCC), 2014 IEEE Symposium on. IEEE, 2014.
Yao, Andrew C. "Protocols for secure computations." Foundations of Computer Science, 1982. SFCS'08. 23rd Annual Symposium on. IEEE, 1982.
Hirt, Martin, Ueli Maurer, and Bartosz Przydatek. "Efficient secure multi-party computation." International Conference on the Theory and Application of Cryptology and Information Security. Springer Berlin Heidelberg, 2000.
C++ Implementation of ZRTP protocol—GNU ZRTP C++—https://github.com/wernerd/ZRTPCPP [Online; Accessed Mar. 30, 2017].
Petraschek, Martin, et al. "Security and Usability Aspects of Man-in-the-Middle Attacks on ZRTP." J. UCS 14.5 (2008): 673-692.
ABY—A Framework for Efficient Mixed-protocol Secure Two-party Computation https://github.com/encryptogroup/ABY [Online; Accessed Sep. 15, 2017].
Keller, Marcel, Emmanuela Orsini, and Peter Scholl. "MASCOT: faster malicious arithmetic secure computation with oblivious transfer." Proceedings of the 2016 Acm Sigsac Conference on Computer and Communications Security. ACM, 2016.
Huang, Yan, Jonathan Katz, and David Evans. "Quid-pro-quotocols: Strengthening semi-honest protocols with dual execution." Security and Privacy (SP), 2012 IEEE Symposium on. IEEE, 2012.
Sakarindr, Pitipatana, and Nirwan Ansari. "Security services in group communications over wireless infrastructure, mobile ad hoc, and wireless sensor networks." IEEE Wireless Communications 14.5 (2007).
Laud, Peeter, and Liina Kamm, eds. Applications of Secure Multiparty Computation. vol. 13. IOS Press, 2015.
Device Pairing Using Short Authentication Strings (2016) https://tools.ietf.org/id/draft-ietf-dnssd-pairing-01.html [Online; Accessed Apr. 21, 2017].
TLS Handshaking With Certificates and Keys (2017) https://mcuoneclipse.files.wordpress.com/2017/04/tls-handshaking-with-certificates-and-keys.png [Online; Accessed Apr. 25, 2017].
Lyrebird claims it can recreate any voice using just one minute of sample audio. (2017) http://www.theverge.com/2017/4/24/15406882/ai-voice-synthesis-copy-human-speech-lyrebird [Online; Accessed Apr. 25, 2017].
Martini, S.: Session Key Retrieval in J-PAKE Implementations of OpenSSL and OpenSSH. (2010) http://seb.dbzteam.org/crypto/jpake-session-key-retrieval.pdf [Online; Accessed Mar. 4, 2017].
Thermos, Peter, and Ari Takanen. Securing VoIP Networks. Pearson Education, 2007.
Canetti, Ran. "Obtaining universally compoable security: Towards the bare bones of trust." International Conference on the Theory and Application of Cryptology and Information Security. Springer Berlin Heidelberg, 2007.
Let's Encrypt issues certs to 'PayPal' phishing sites: how to protect yourself (2017) http://bit.ly/2i7Z4bT [Online; Accessed May 19, 2017].
Yao, Andrew Chi-Chih. "How to generate and exchange secrets." Foundations of Computer Science, 1986., 27th Annual Symposium on. IEEE, 1986.
Yao, Andrew C. "Theory and application of trapdoor functions." Foundations of Computer Science, 1982. SFCS'08. 23rd Annual Symposium on. IEEE, 1982.
Lindell, Yehuda, and Benny Pinkas. "Secure multiparty computation for privacy-preserving data mining." Journal of Privacy and Confidentiality 1.1 (2009): 5. APA.
McGrew, D., et al. "RFC 3711: The secure real-time transport protocol (SRTP)." Cisco Systems, Inc and Ericsson Research, Tech. Rep (2004).
Sisalem, Dorgham, et al. SIP security. John Wiley & Sons, 2009.
Hlavacs, Helmut, et al. "Enhancing ZRTP by using Computational Puzzles." J. UCS 14.5 (2008): 693-716.

(56) References Cited

OTHER PUBLICATIONS

Afifi, M. H., et al. "Dynamic Authentication Protocol Using Self-Powered Timers for Passive Internet of Things." IEEE Internet of Things Journal (2017).

Pass, Rafael. "Bounded-concurrent secure multi-party computation with a dishonest majority." Proceedings of the thirty-sixth annual ACM symposium on Theory of computing. ACM, 2004.

Bresciani R, "The ZRTP Protocol Analysis on the Diffie-Hellman Mode", Trinity College Dublin, Computer Science Department Technical Report, Jun. 12, 2009.

Hoepman Jaap-Henk, "The Ephemeral Pairing Problem", The Department of Computer Science, University of Nijmegen, NL, Feb. 6, 2008.

* cited by examiner

INTERNET OF THINGS SECURITY WITH MULTI-PARTY COMPUTATION (MPC)

CROSS-REFERENCE TO RELATED APPLICATIONS

This application is a continuation of U.S. patent application Ser. No. 17/055,671, file don Nov. 16, 2020, which is a 371 National Stage Application of PCT Application Serial No. PCT/EP2019/062713 filed on May 16, 2019, and claims priority to and benefit of Portuguese Patent Application No 20181000034529 filed on 16 May 2018 and European Patent Application No. 18 174 412.9 filed on 25 May 2018.

BACKGROUND TO THE INVENTION

Field of the Invention

The present invention relates to the Internet of Things.

Brief Description of the Related Art

The Internet of Things (IoT) is a concept of how technology will interact with people in the coming years. It is a collection of "things" or devices connected to a network, such as a private internet and/or the public Internet in which "smart" devices not only interact with people, but also interact with each other. Data released by Gartner's research organisation predict that there will be 25 (US) billions of such smart devices connected to the Internet by 2020. These physical and virtual "things" have identities, physical attributes, virtual personalities, and react substantially autonomously to events in the real/physical world influencing these events with processes without direct human intervention.

Due of the exponential growth in this area, there are several privacy and security challenges. In particular, there is a need to adapt security solutions to the particular characteristic of IoT devices. There are resource limitations in the IoT devices which are not found in conventional devices. Yang, Yuchen, et al. "A Survey on Security and Privacy Issues in Internet-of-Things." IEEE Internet of Things Journal (2017). These include limited battery life and memory space in the IoT device. The set of security and privacy requirements necessary for the IoT device include, but are not limited to, user and device identity management, authentication, the confidentiality of data exchanged in communications between different ones of the IoT devices, network access control to allow only authorized ones of the IoT devices access to the IoT network, and the availability of resources and systems. H. Sundmaeker, P. Guillemin, P. Friess and S. Woelfle, "Vision and Challenges for Realising the Internet of Things," Cluster of European Research Projects on the Internet of Things, 2010.

To date, most research and existing IoT platforms are focused on device management and employ trusted, centralized solutions for authentication and security. These centralised solutions are based on a Public Key Infrastructure (PKI). Despite the obvious advantages of using the PKI, solutions based on the PKI tend to be complex, expensive, and not easy to administer. Umar, Amjad. Information Security and Auditing in the Digital Age. nge solutions, inc, 2003. In addition, there are the afore-mentioned resource limitations with a device that is connected to a PKI-based network.

The physical security of the IoT devices is also known to be a problem, as any keys stored in a memory on the IoT device may be read off a physically captured IoT device and used by an adversary to launch an attack against the IoT network in which the IoT device was incorporated. Aman, Muhammad, Kee Chaing Chua, and Biplab Sikdar. "Mutual Authentication in IoT Systems using Physical Unclonable Functions." IEEE Internet of Things Journal (2017).

The PK.I relies exclusively on a Certificate Authority (CA) for validation of security certificates within the network (such as the IoT network discussed above). The CA represents a single point-of-failure within the infrastructure of the network. While failure points are known to exist in various protocols, it is highly desirable that these failure points should not be unique or centralized (such as in the CA) in order to enable the networks to become more resilient to any attacks on the network. The PK.I is totally and irreversible compromised if the private key of the CA is disclosed. Any attacker obtaining the private key can easily issue a new certificate and, therefore, impersonate and perform so-called Man-in-the-Middle (MitM) attacks in the compromised network. The MitM attack is when the attacker secretly relays and possibly alters communication between two parties in the network who would otherwise believe that the two parties are actually directly communicating with each other. For example, in the case of a simple disclosure of the server certificate, a so-called "attack window" is opened during which the attackers can compromise the network. This attack window remains open that disclosed server certificate is revoked, which may not be immediately done, for example if the attack is not noticed for some time.

Another problem that is known to occur in the PK.I is when poorly managed Cas sign certificates for a particular domain without correctly verifying ownership over the domain.

Given the aforementioned limitations, the underlying assumptions in the PK.I are not necessarily the best fit for the IoT network and the IoT devices.

Diffie-Hellman (DH) key exchange is a method of securely exchanging cryptographic keys over a public channel in the network and is based on the establishment of a shared secret between the two parties wishing to communicate over the network. DH key exchange is based on the concept that two parties (typically known as Alice and Bob) each establish secret parameters, which are kept secret to themselves, and a starting parameter which is kept non-secret and agreed between the two parties. The starting parameter is mixed on both sides with the secret parameters and then exchanged as a public key. After exchange of the public key, the public key is mixed with the own secret parameters and both parties then have an identical value that can be used for encryption of the communication. Unfortunately, the DH key exchange is also vulnerable to MitM attacks since the DH key exchange does not provide authentication of the communicating parties. The attacker can therefore impersonate both Bob and Alice, i.e., the communicating parties.

Several protocols are known in which the two parties can communicate directly with each other to confirm their identity by passing and confirming a Short Authentication String (SAS). These protocols include Z Real-time Transport Protocol (ZRTP) and Password Authenticated Key Exchange by Juggling (J-PAKE) and are based on the premise of human interaction and manual provisioning. See, Hao, Feng, and Peter YA Ryan. "Password authenticated key exchange by juggling." International Workshop on Security Protocols. Springer Berlin Heidelberg, 2008; Hao, Feng. "J-pake: Password authenticated key exchange by juggling." (2016).

Such known protocols are not, however, suitable for communication with the IoT devices as the protocols are based on human interaction, which is not practical between pairs of the IoT devices.

Other solutions on offer include the PAKE (Password-Authenticated Key Agreement) protocols. Currently, the most sophisticated algorithms do not perform key exchanges based on public key cryptography and allow low-entropy passwords to be used. In Lancrenon, Jean, Marjan A krobot, and Qiang Tang. "Two More Efficient Variants of the J-PAKE Protocol." International Conference on Applied Cryptography and Network Security. Springer International Publishing, 2016, the three state-of-the-art PAKE protocols are discussed. In the same paper, there are also disclosed two protocols that are more efficient than the J-PAKE protocol, which were adopted as the defaults in the OpenSSL environment.

The J-PAKE protocol is based on a concept of a shared password, which does not require a PKI or a third party in order to establish a secure communication between two parties. J-PAKE uses an elliptic curve DH for the key agreement and Schnorr Non-Interactive Zero-Knowledge (NIZK) signatures (Hao, Feng., Ed. "Schnorr NIZK Proof: Non-interactive Zero Knowledge Proof for Discrete Logarithm" (2013)) proof mechanism to authenticate the two parties and establish a shared secret between the two parties based on a passphrase. There are some services that still use the J-PAKE protocol, such as the Pale Moon Web-Browser, the lightweight API in Bouncycastle (version 1.48 and onwards), and the Thread (IoT wireless network protocol). This protocol was also previously supported by FireFox Sync, OpenSSH, and OpenSSL, but was removed after 2014.

There are several known J-PAKE issues, already published by Mohsen Toorani. See, Toorani, Mohsen. "Security analysis of J-PAKE." Computers and Communication (ISCC), 2014 IEEE Symposium on. IEEE, 2014. Toohrani presents an analysis of J-PAKE, as used by Firefox Sync, and has identified vulnerabilities in J-PAKE. For example, J-PAKE is vulnerable to a password compromise impersonation attack and has other shortcomings with respect to replay and Unknown Key-Share (UKS) attacks. J-PAKE has also been included in OpenSSL and OpenSSH, but problems were reported during implementation. Martini, S.: "Session Key Retrieval in J-PAKE Implementations of OpenSSL and OpenSSH," (2010) (Online; Accessed 3 Apr. 2017).

Device Pairing Using Short Authentication Strings is a two-device pairing mechanism based on the agreement and checking of a secret's authenticity using the SAS. This protocol comprises three phases: discovery, agreement, and authentication. When the pairing service starts, the server starts publishing a chosen instance name. The client will discover that name and the corresponding connection parameters. "Device Pairing Using Short Authentication Strings," (2016) (Online; Accessed 21 Apr. 2017).

After the server is discovered, the client and server use a transport layer security (TLS) session which allows the client and server to agree on a shared secret using a cryptographic protocol that produces the SAS. After the completion of this phase, there is an authentication phase, used to validate the pairing through the SAS. In this authentication phase, the comparison of the SAS is made through a manual verification, i.e., the user has to verify that both of the devices (server and client) wishing to communicate display the same string. If, instead, the server and client support Quick Response (QR) codes, then the server displays a QR code with the encoding of the SAS, and the client is capable of scanning the value of the SAS and comparing the scanned value to a locally computed value.

ZRTP (Zimmermann, Phil, Alan Johnston, and Jon Callas. ZRTP: Media path key agreement for unicast secure RTP. No. RFC 6189. 2011) is a two-point multimedia communication protocol that contains a session set-up phase used to agree on key exchange and parameters for establishing Secure Real-Time Transport Protocol (SRTP) sessions. This ZRTP protocol is not based on digital certificates, but on DH keys generated in each session (and discussed earlier). These DH keys contribute to the generation of the session key and parameters for the SRTP sessions. Although the ZRTP protocol initially needs to use a signalling protocol, such as a Session Initiation Protocol (SIP), the key negotiation is performed only by the ZRTP implementation. The DH algorithm, alone, does not provide sufficient protection, however, against MitM attacks. To authenticate both peers in the key exchange in the ZRTP protocol, a SAS is used that is distributed to both phones and compared verbally by both ends. If the SAS is the same, then both of the users must press a button in order to accept the key.

U.S. Pat. No. 7,730,309 teaches a method and system for a secure telephone protocol. The secure telephone protocol can include a shared secret value that is cached and is then later re-used to authenticate a long series of session key which are used for separate secure phone calls. This enable cryptographic key continuity without the need for voice authentication by a user. The system of the patent utilizes the DH key exchange during call setup and thus suffers the limitations set out above.

As noted above, the existing solutions do not provide a satisfactory authorisation and encryption method for exchanging messages, including data, between IoT devices in the IoT network.

SUMMARY OF THE INVENTION

There is need of a new approach for autonomous mutual pairing through the exchange of a short authentication string (SAS) that does not involve human interaction by a user for the validation of the SAS and the security of a communications channel.

This disclosure teaches system and method a so-called key exchange with autonomous verification using multi-party computation between two devices. The key exchange is used for establishing secure communications between any two parties, such as the IoT devices, devices implementing a Voice over IP (VoIP) protocol, or other units in the network. The system and method are based, for example, on a Diffie-Hellman (DH) key exchange. The method and system described in this document does not, however, require the presence of a PK.I or any trusted third party, such as a Certificate Authority.

Multi-party computation (MPC) poses itself as a suitable option for offering the basic building block for building decentralised privacy preserving computational frameworks. The goal of MPC is to enable parties to compute some joint function of their own private inputs. Yao, Andrew C. "Protocols for secure computations." Foundations of Computer Science, 1982. SFCS'08. 23rd Annual Symposium on. IEEE, 1982. This protocol must preserve some security properties: the correctness of the outputs and privacy of inputs, even if some of the players are corrupted by an active or passive maliciously adversary, i.e., without revealing more information than the output of the function itself. See, Hirt, Martin, Ueli Maurer, and Bartosz Przydatek. "Efficient secure multi-party computation." International Conference on the Theory and Application of Cryptology and Information Security. Springer Berlin Heidelberg, 2000.

The method of this disclosure is implemented as follows for establishing a communication along a communications channel between a first device and a second device. The first device and the second device are local devices and could, for example, be members of an IoT network comprising a plurality of such devices, or a VoIP network. The devices in the VoIP network are devices for transmission of voice-based messages.

The method comprises mutual discovery of the first device and the second device by, for example, exchanging initiation and acknowledgement messages between the first device and the second device. This mutual discovery can be carried out by an automatic exchange of messages between the first device and the second device as a direct communication. One alternative, used for example in the aforementioned VoIP network, is the use of a centralised server, called a SIP server, which is able to authenticate the communications channel between the first device and the second device. Secret session keys are then established between the first device and the second device.

The communications channel between the first device and the second device is subsequently validated by calculating a first SAS in the first device and a second SAS in the second device and then inserting the first SAS in a first MPC module in the first device and the second DAS in a second MPC module in the second device. The multi-party communications (MPC) modules confirm the security of the communications channel by evaluating the first SAS in the second MPC module and the second MAS in the first MPC module. Subsequently, a shared secret is established between the first device and the second device using multi-party computation and encrypted messages can be exchanged along the communications channel.

In one aspect of the disclosure, the authentication by exchanging of initiation and acknowledgement messages comprises generating a random number identifier of at least one of the first device and the second device. Thus, the devices receive different identifiers for each communication session for the exchange of communications. As noted above, in a VoIP network, the mutual discovery will be carried out by using a so-called SIP server (SIP=session initial protocol) which knows the identities of the devices which can use the VoIP protocol. Subsequent data transfer in the VoIP network is made in a peer-to-peer manner.

The method further comprising sending a confirm message from the first device to the second device and a confirm message from this second device to the first device after successful comparison by multi-party comparison.

It will be noted that the SAS is, in one implementation of the method, identical in both the first device and the second device and the multi-party communication module implementing the validation of the communication channel is adapted to check that the SAS received from the first device is equal to that generated in the second device.

In one aspect of the disclosure, the first secret key is generated from a previous first secret key and the second secret key is generated from a previous second secret key and in other aspect of the invention and the validating of the communications channel is carried out before exchanging every message along the communications channel. In a further aspect, the validating of the communications channel is carried out only after exchanging a number of messages along the communications channel.

This disclosure also teaches a network employing this method to enable secure communication between the local devices in the network. The devices comprise a transmitter for transmitting messages along a communications channel to one or more of the other ones of the plurality of devices, a receiver for receiving messages from the communications channel from one or more of the other ones of the plurality of devices, a multi-party computation module for authenticating the communications channel by comparing a generated SAS with a received SAS, and another one of the plurality of device and generating a session key, a communications module for encrypting messages using the generated session key.

The devices may also further comprise a storage for storing a plurality of session keys and may also further comprises a pseudo random number generator for generating a pseudo-random number identifying the devices.

DETAILED DESCRIPTION OF THE INVENTION

Figure 1A:
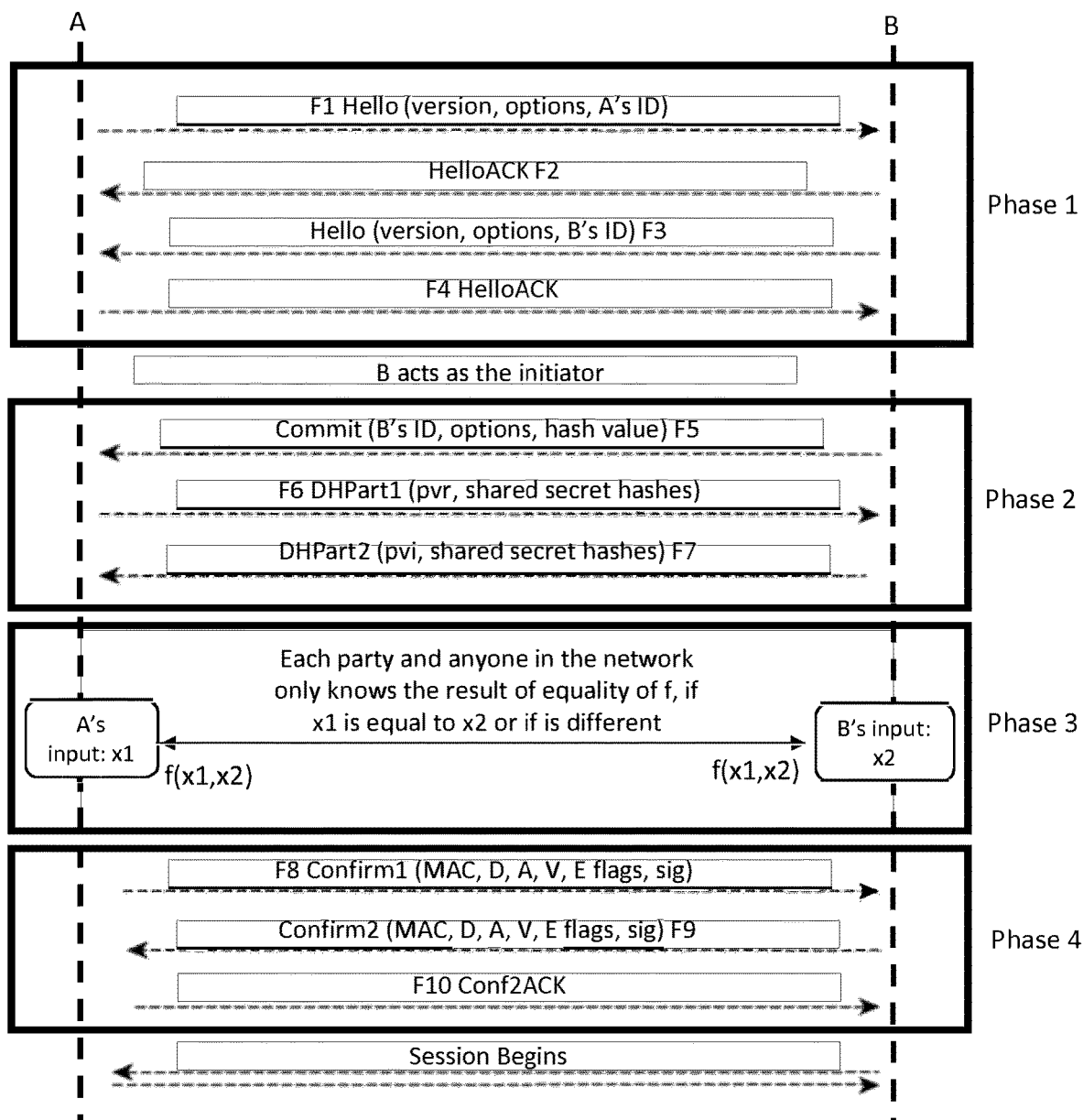
FIG. 1A shows a first communications scheme between two parties.

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The work described in this document involves a design and implementation of a system and method for secure peer-to-peer data exchange between two (local) devices in a network, and more particularly in an IoT network and a VoIP network. The system and method are a decentralised solution for the authentication of the communication between the two device and, unlike the prior art PK.I, are not a centralized solution and the system and method of this document has no single point-of-failure. The use in peer-to-peer data exchange does not preclude the use of the system and method in a network in which one or more central servers are present and can also communicate with the local devices.

The system and method have a lightweight architecture and therefore provide a solution for an IoT environment with a plurality of individual IoT devices and other units in an IoT network without additional overheads. The system and method are adaptable for different requirements. As explained below, users of the IoT network can prioritise speed or introduce additional security checks, which will increase the runtime overhead.

The system and method do not rely on human intervention and can therefore be used for secure Voice over IP (VoIP) communications. The method can be adapted to ZRTP VoIP application and thus eliminate the need for human intervention, or to validate a communications channel, as will be explained later.

The system and method make use of the concept of multi-party computation (MPC). This is a sub-field of cryptography which was formally introduced as a form of secure two-party computing in 1982 and generalised in 1986 by Andrew Yao. See, Yao, Andrew C. "Protocols for secure computations." Foundations of Computer Science, 1982. SFCS'08. 23rd Annual Symposium on. IEEE, 1982; Yao, Andrew C. "Theory and application of trapdoor functions." Foundations of Computer Science, 1982. SFCS'08. 23rd Annual Symposium on. IEEE, 1982; and Lindell, Yehuda, and Benny Pinkas. "Secure multiparty computation for privacy-preserving data mining." Journal of Privacy and Confidentiality 1.1 (2009): 5. APA. The idea behind MPC is to perform computations privately. In this case, suppose that N parties want to compute a function $$EQ\ f(t\backslash s\backslash do5(1)\backslash, \ldots \backslash, t\backslash s\backslash do5(N))=S \qquad (\text{Eqn. 1})$$

where the party i is responsible for input ti.

The goal is that neither of the parties can obtain more information beyond the pair (ti; S), i.e. the input ti $_{and}$ S, the result of the function f No input tJrom the party i can be revealed to any of the other parties, and each party receives only its output. One non-limiting example of the function is the equality function, which is implemented in an MPC module. Suppose two parties, i.e. two IoT devices each have an input t1 and tz. The MPC module receives individually from each of the two IoT devices the corresponding values t1 and t2. The MPC module returns the value S=1 if the values of t1 and t2 are equal and the value S=0 if the values t1 and t2 are not equal. In the latter case (i.e. S=0) this could mean that there is a man in the middle attach present and the communication between the two IoT devices cannot be trusted to be secure. This concept can be adapted to other parties, such as devices implementing a VoIP protocol.

There are some properties that must be present in the MPC protocol in order for the MPC protocol to be secure. The MPC protocol has to guarantee privacy, which means ensuring that no one (apart from the parties themselves) will know the inputs ti of the parties i, i.e., each party i only knows the output S of the function shown in Eqn. 1, which is the answer to the requested problem. Take as an example, an auction, where the only bid revealed is that bid of the highest bidder. It is clearly possible to derive that all the other bids were lower than the winning bid. However, this should be the only information revealed about the losing bids. Another property that the MPC protocol must have is correctness, whereby it must be guaranteed that each one of the parties i receives the correct output S. In the example of an auction, this implies that the party i with the highest bid is guaranteed to win, and no party, including the auctioneer, can alter this result. See, McGrew, D., et al. "RFC 3711: The secure real-time transport protocol (SRTP)." Cisco Systems, Inc and Ericsson Research, Tech. Rep (2004).

The system and method of this document are based on an DH key exchange to overcomes the complexity of PK.I systems or the use of a trusted third party. As discussed in the introduction, DH alone cannot ensure authentication, and DH has an MitM problem. See Seo, Dong Hwi, and P. Sweeney. "Simple authenticated key agreement algorithm." Electronics Letters 35.13 (1999): 1073-1074.

Zimmerman P. et al. (Zimmermann, P., J. Callas, and A. Johnston. "ZRTP: Media Path Key Agreement for Unicast Secure RTP (RFC 6189)." (2011): 2070-1721) proposed a solution to this MitM problem by using a "double check". This double check allows the detection of any of the MitM attacks through displaying the SAS for each of the users in the PK.I system to read aloud the SAS and enable the parties to verbally compare the SAS over the phone in a Voice Over Internet Protocol (VoIP) communication (or indeed communication over any other protocol allowing voice communication over an audio channel). The users must actively press an "ok" button on, for example, a touchscreen or a return key on a keyboard to confirm that the SAS is equal. This solution (termed the ZRTP protocol) lacks, however, the possibility of adapting this protocol for pure data exchange without the audio channel and thus no aural or oral communication is possible. In other words, a protocol for the exchange of data using the idea of Zimmermann of comparison through voice cannot be used because there is no audio or secure channel established through which it is possible exchange automatically the SAS securely without intervention from the user. One further issue with the ZRTP protocol is that "lazy" or "irresponsible" users may simply confirm the SAS without really verifying that the SAS is equal.

The system and method of the current document solves this authentication problem by adding an extra security layer based on the MPC sub-field of cryptography. This extra security layer comprises two (or more) parties, wherein each one of the parties has their own input. Suppose now that both of the parties wish to perform some computation on an item of data, without revealing their own input to the data to other ones of the parties or to the network as a whole. It is necessary to compare automatically the SAS privately and without human intervention. In addition, the validity of the SAS is assured at any moment in time because, for extremely sensitive communications, this double-check is critical. The automatic comparison of the SAS also eliminates the risk of the lazy or irresponsible user confirming the SAS without really checking its validity.

Figure 1B:
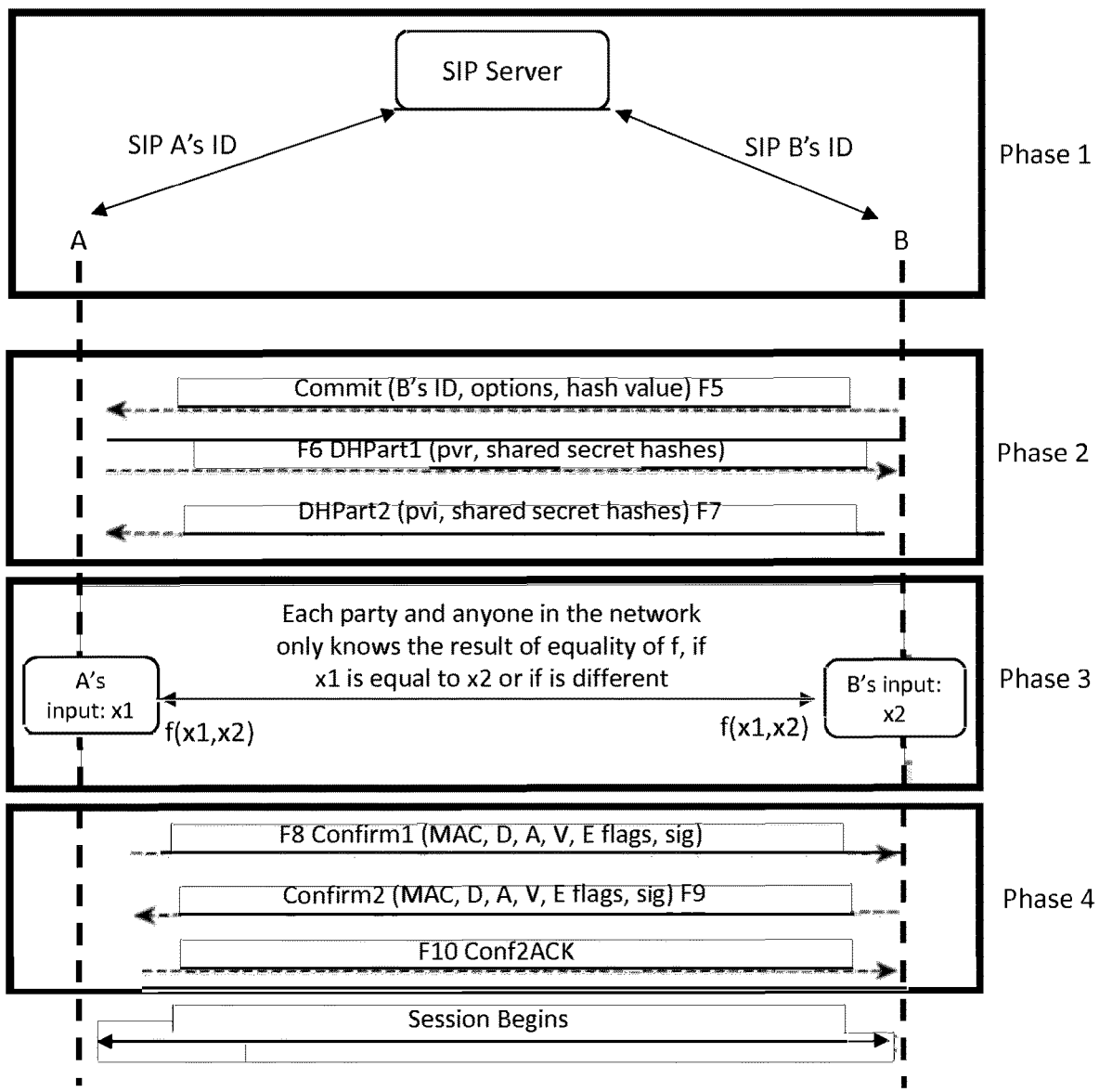
FIG. 1B shows a second communications scheme between two parties.
Figure 2:
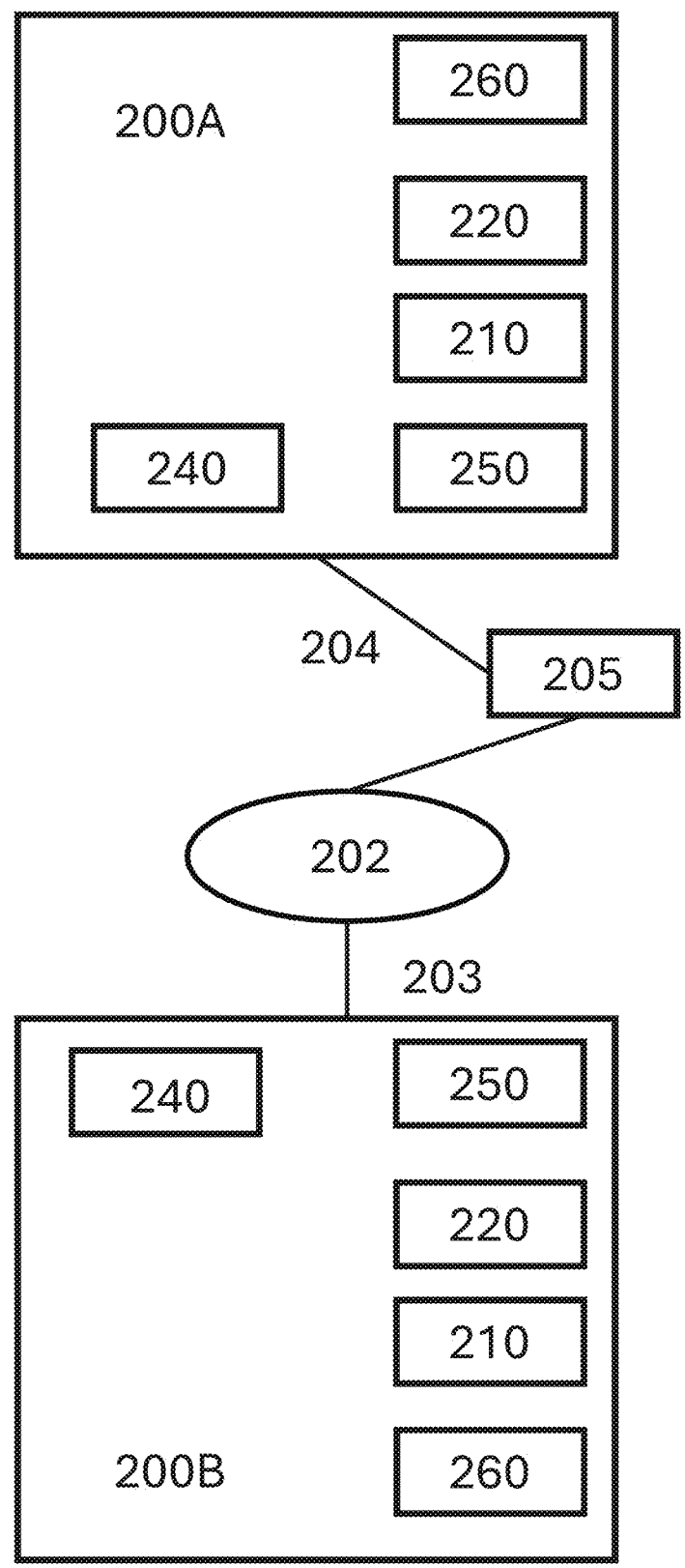
FIG. 2 shows an overview of the network with two devices.

FIG. 1A illustrates the communication scheme between two devices (200A and 200B) in an IoT network shown in FIG. 2 using the system and method of the current document. FIG. 1B shows an adaptation of the communications scheme when the two devices 200A and 200B are devices for communicating using a Voice over IP protocol. It will be appreciated that in such a case the two devices 200A and 200B could be smartphones, tablets or computers, but this is not limiting of the invention.

FIG. 2 shows two devices 200A and 200B that can communicate with each other and exchange data in the form of messages with each other. The messages can be purely data messages or could be packets with voice data using the VoIP protocol. The two devices 200A and 200B include a multiparty computation module 210, whose function will be explained later, and identifier file 220 for storing and caching a session key. The two devices 200A and 200B also include a transmitter 240 and a receiver 250 as well as a power source 260. The two devices 200A and 200B are, for example, sensors with a limited amount of storage and power available.

The communications scheme in FIG. 1A between the two devices 200A and 200B starts with both of the devices 200A and 200B automatically exchanging HELLO and HELLO-ack messages (acknowledgement of receipt of the HELLO message) in steps F1 to F4 using the transmitters 240 and receivers 250. This exchange of messages occurs without intervention from a user and is shown as Phase 1 on the Figure. In these HELLO and HELLOack messages, the identification of both of the two devices 200A and 200B are revealed to each other. The identification is generated using a Pseudo Random Number Generator (PRNG) and this identification is validated during the Phase 1. After this exchange of messages in Phase 1, the key agreement exchange in Phase 2 can begin with a Commit message in step F5 from the device 200B to the device 200A. The scheme shown in FIG. 1A assumes that the device 200B is the initiator. There are two approaches that can now be carried out in order to agree a key between the device 200B and the device 200A.

In a first approach the devices 200A and 200B exchange a new shared secret through the DH exchange. This is shown in steps F6 and F7. In the second approach, the devices 200A and 200B do not need to exchange a new shared secret because there already exists a shared secret that has been previously exchanged between the devices 200A and 200B. As a result, the DH calculation in this second approach is omitted by the devices 200A and 200B. However, the so-called DHPart1 and DHPart2 messages in steps F6 and F7 are still exchanged between the devices 200A and 200B to determine which one of the several stored shared keys in the devices 200A and 200B should be used. The DHPart1 and the DHPart2 messages are defined in the ZRTP protocol and are the public DH values. Instead of the DH values (hvi and pvr), the devices 200A and 200B use nonces, along with the retained secret keys, to derive the key material. Canetti, Ran. "Obtaining universally composable security: Towards the bare bones of trust." International Conference on the Theory and Application of Cryptology and Information Security. Springer Berlin Heidelberg, 2007. This is described in detail in the RFC document 6189 ZRTP: Media Path Key Agreement for Unicast Secure RTP from the Internet Engineering Task Force (ISSN 2070-1721), see section 4.41.1 (downloadable at https://tools.ietf.org/html/rfc6189#section-4.4.1.1).

The communications scheme in FIG. 1B is similar to that shown in FIG. 1A, except that the discovery of the communications channel between devices 200A and 200B is not carried out by sending a Hello message and receiving a HelloACK response in Phase 1. The two devices 200A and 200B are both known to the SIP server (which is a central server) and thus Phase 1 involves the exchange of the identifications of the two devices 200A and 200B (which are local devices) from the SIP server to the other one of the two devices 200A and 200B. After the exchange of the identifications of the two (local) devices 200A and 200B using the central SIP server, data can be exchanged directly between the two (local) devices 200A and 200B.

After completion of these steps F6, in Phase 3 the multiparty computation (MPC) module 210 in each of the devices 200A and 200B is used to make an automatic validation of the SAS by comparison, as described above. The SAS is a series of letters and numbers which is generated from the session key of the two devices 200A and 200B. The generation of the SAS value is described in the ZRTP RFC (https://tools.ietf.org/html/rfc6189#section-4.5.2), KDF uses a HMAC (https://tools.ietforg/html/rfc6189#section-4.5). Any differences in the session key which has previously been negotiated between the devices 200A and 200B will generate different values for the SAS at the two devices 200A and 200B.

In the non-limiting case described above the MPC module 210 implements the equality function to test whether the generated SAS in the device is equal to a received SAS from another device, and the MPC module 210 returns the value S=1 if this equality is verified, i.e. the SAS generated in the two devices 200A and 200B is the same and thus the communication between the two devices 200A and 200B. It is then possible for the two devices 200A and 200B to send a Confirm message in steps F8 to F10 to the other one of the two devices 200A and 200B indicating that the other device has accepted and verified the SAS. (Phase 4). Finally, the communications protocol is ready to start sending data in this secure session. In the event that the value S=0, indicating that the validation has failed and there is a possible man-in-the-middle attack, then no communication will be established between the devices 200A and 200B.

The method and system take advantage of some additional security and privacy properties as forward secrecy in order to guarantee confidential communication in the future. For example, when the two devices 200A and 200B performs multiple connections at different times with each other, the method and system rotate the keys between each ones of the sessions so that the same key is not used in a following session. This way, the keys used for the different communications over the multiple connections are different.

The identifier file 220 in each of the devices 200A and 200B caches the symmetric key used to compute the secret session keys, and these secret session keys change with each session. Suppose an attacker gets access to the local seed which was used and will be used to derive the future and current session keys, which property is termed forward secrecy. The attacker will not be capable of reproducing or replaying any of the previous exchanges of data in the communications between the two devices 200A and 200B because of the property of forward secrecy. The attacker cannot recompute the secret session keys for previous sessions form the accessed local seed. In other words, if a single communication is compromised then only this single communication (exchange of messages) will be compromised, but not other exchanges of messages in different communications or sessions. This could happen if the session key for this single communication session being somehow "leaked", then this leak of the session key does not compromise the confidentiality of all of the previous communications prior to the current communication.

In this way, the system and method are able to provide additional protection in the communication because, even if the devices 200A and 200B do not bother with exchange the SAS before the communication, there is still fairly decent authentication against a MitM attack, based on a form of key continuity, as explained in the following paragraph.

The idea of key continuity is that the session key is used only once for the exchange of communication during that session, but the session key is itself used as a seed to generate the session key for the following session with exchange of communications. This session key for the following session can be subsequently used as the seed for the generation of further (subsequent) session keys, and so on. In other words, the old session key is used to generate the new session key and, as a result, the complexity of the session keys becomes greater with each use and the session keys become more secure.

The negotiation of the session keys between the devices 200A and 200B is done by generating a sequence of letters and numbers as the SAS. The size of the SAS can be defined. As discussed above, the SAS must be equal at both devices 200A and 200B. In the case of ZRTP, any attempt to capture and decrypt the voice used as the SAS will cause the sequences of letters and numbers to be different. The sequence is a mathematical function derived from the initial key of both devices 200A and 200B, so that any differences in the session key apparently negotiated between the devices 200A and 200B will generate different values for the SAS.

This key continuity solution is suitable in the context of the IoT network, as the number of IoT devices in IoT networks are increasing and automatic provisioning of the session keys is necessary, so there is no need for provisioning individually the session key to each ones of the devices 200A, 200B beforehand. Moreover, with this solution, end-to-end privacy is obtained without the use of the PK.I.

The system and method have three different possible modes for this system, as is shown in Table 1. Users can choose which one of the three modes best suits the implementation in question.

This first mode of use is entitled the "Without Key Continuity Mode." This first mode takes advantage of the existing mechanism of the ZRTP, presented in the section 4.9.1 of the ZRTP draft, in which an implementation without a cache in any device is suggested. This feature will allow the system and method to always be executed in DH mode (based also on the ZRTP DH mode). In this first mode, it is mandatory to compare the SAS using the MPC between the devices to validate the session.

This first mode is a safe state with some security issues solved. One of the security issues is the impossibility of an opponent being able to obtain the local shared secret. In this first mode, the connection between the devices 200A and 200B is always considered to be a brand-new connection, in which the devices 200A and 200B have never agreed on a session key for communication between the two devices 200A and 200B beforehand. Therefore, this new connection is not "derived" from the previous connection and the Key Continuity Property cannot be used to create a new key. This first mode does not require any additional storage in memory on any of the devices 200A or 200B to store previously used keys from which the new key will be derived. However, this first mode does add overhead to the network connecting the two devices 200A and 200B due to the need to perform MPC for every new connection. This extra overhead needs to be taken into consideration and balanced with the other requirement to have extra storage in the devices 200A and 200B.

The second mode is a normal mode and is based on the existing mechanism of the ZRTP, presented in the section 4.4.2 of the ZRTP RFC and is denoted the pre-shared mode.

In this second, normal mode, the key continuity feature is used so that it is not necessary to always compare the SAS in all iterations using the MPC. However, this comparison will happen after every N connections are made between the two devices 200A and 200B. The value of N can be defined by the user. In one non-limiting aspect, the default value of N is 10. In other words, after every 10 exchanges of communication, it is verified that the protocol is running as expected.

The forward secrecy and key continuity properties are preserved in this second mode.

The third mode is a "paranoid" mode for the case in which it is necessary at each iteration, i.e. each separate establishment of the communication between the two devices 200A and 200B, to verify the security of the communication between the two devices 200A and 200B. There will be no derivation of keys or storage of keys from which new keys can be derived. This paranoid mode will be used, for example, in questions of anonymous or sensitive data. These paranoid modes will have more complexity in order to assure an extra safety check. There will also be a modified, "safe" mode that does not have the extra security checks, but which will generate the SAS for few iterations and trusts the key continuity thereafter.

In this third "paranoid" mode, the key continuity is also used as in the second normal mode. However, this third mode is "paranoid" as the third mode requires extra verification by comparison of the SAS to ensure that the SAS at both of the devices 200A and 200B is equal and that there was no error. In this third mode, the MPC is used on all connections at every iteration to compare the SAS.

It will be appreciated that this third mode requires a greater overhead in the network and on the devices 200A and 200B order to assure the extra safety check.

This third mode is desirable for more sensitive data because this third mode guarantees in all connections that the protocol ran normally, and that the SAS is equal in the two connected devices. In this third mode, only the concept of the key continuity is used.

As noted above, the system and method of this document is used in IoT networks, such as shown in FIG. 2. It can be assumed that the devices 200A and 200B in the IoT network have few resources, there are several types of systems, there are various types of operating systems, and are able to adapt to various types of use. Based on these assumptions, the system and method offer the following characteristics.

Usability. As noted above, some secure proposals in the prior art do exist, but, in order to apply these prior art secure protocols, many procedures are necessary, and many of the prior art secure protocols require previous key changes. It will be recalled that, the exchange of the session keys by unsecured means (unencrypted email for example over the open Internet) can compromise all of the security of the process for the exchange of communication between the devices.

The method and system of this documents is easy to use. This can be compared to the case of J-PAKE, for example as implemented in Firefox Sync. J-PAKE is less easy to use, since JPAKE requires that the SAS be written to provision the two devices. In the method and system of this document, the provision of the SAS is an automatic and secure process and the process is transparent for the user (through the combination with MPC that compares the SAS). As noted above, the devices 200A and 200B in the IoT shown in FIG. 2 often do not have a screen on which it is possible to display information about the SAS to enable a human to carry out the pairing of the two devices 200A and 200B, or at least users cannot interact with this screen easily and thus it may be necessary to have a keyboard or another device.

Lightweight. The existing limitations of the devices 200A and 200B in the IoT network, i.e. low power and processing, are well known. This makes the use of a PK.I difficult to use in the IoT network. The method and system of the current document address these issues, as the method and system are more suitable for low-resource devices without any need for the PK.I, key certification, trust models, certification authorities, etc., which bring with them inherent complexity.

Decentralised. This method and system differ from the PK.I because the system is decentralised and does not rely solely and exclusively on a single a CA, but rather encompasses a number of reliable, independent elements.

The implementation of this method and system is based on two libraries: ZRTPCPP (see, "C++ Implementation of ZRTP protocol GNU ZRTP C++," (Online; Accessed 30 Mar. 2017)), which is a C++ implementation of the ZRTP protocol—GNU ZRTP C++ and ABY ("ABY—A Framework for Efficient Mixed-protocol Secure Two-party Computation," (Online; Accessed 15 Sep. 2017)) framework which efficiently combines secure computation schemes based on arithmetic sharing, Boolean sharing, and Yao's garbled circuits, and makes available best-practice solutions in secure, two-party computation. Yao, Andrew Chi-Chih. "How to generate and exchange secrets." Foundations of Computer Science, 1986., 27th Annual Symposium on. IEEE, 1986.

ZRTPCPP. The library ZRTPCPP is used.

Some adaptations were made, and some features added to the ZRTPCPP library. In order to prevent a collision of the SAS, which can originate the MitM attack, the inventors increased the cipher key size (the Advanced Encryption Standard (AES) key), producing a new version of the SAS with a greater size. The collision of the SAS could happen when the MitM attack happens by chance to generate the same SAS or is able to run through combinations of possible SAS before detection. The increase in size of the SAS adds an extra degree of security regarding the communication cipher and also makes the collision of the SAS harder for an attacker. It will be appreciated that the more difficult it is to create unintentional collisions, then the better the quality of the algorithm.

In order to support the pre-shared mode, the ZRTPCPP library was also adapted to support an SAS-verified flag that indicates that the SAS comparison between any of the devices 200A, 200B was made successfully previously and that the communications channel was therefore validated. Normally, in the standard ZRTP, the concept of the verified SAS is never defined, because the verified SAS requires some complexity and extra storage is required to add an extra interface to accept the verified SAS. The method and system of this document has the previously additional layer of MPC that takes away the complexity of the user interface. As noted above, the use of MPC to compare the SAS automatically without the need for manual intervention by the user.

In both applications of the method and system, i.e. VoIP or IoT, the same changes are made at this level. However, in the IoT use case, it is not necessary to keep the interface to accept the SAS, while in the VoIP use case, the MPC is used as a first or second factor authentication (to be sure that the SAS is equal, and that the call along the communications channel is secure) and so, the extra interface to accept the SAS is maintained.

ABY. The library ABY combines secure computation schemes providing three different secret sharing schemes: Arithmetic sharing, Boolean sharing, and Yao's garbled circuits. These secret sharing schemes allows two-party computation, for example between the devices 200A and 200B, to be secure. The ABY library also allows the pre-computation of almost all cryptographic operations and provides novel, highly efficient conversions between secure computation schemes based on pre-computed oblivious transfer extensions.

This ABY library only considers semi-honest (passive) adversaries. The ABY library assumes a computationally-bounded adversary who tries to learn additional information from the messages exchanged during the communication between the two devices 200A and 200B during the protocol execution. The adversary cannot deviate from the protocol, so the ABY is protected against passive insider attacks by administrators or government agencies, or when the parties can be trusted to not actively misbehave.

This implementation in the ABY library includes some sample applications, such as the Millionaire's Problem, secure-computation AES, Euclidean Distance, and some others that can be found in the GitHub source code. The Millionaire's Problem was used with an adaptation for the input obtained from a local file on the computer. The Millionaire's Problem was adapted to an equality problem.

For this adaptation, the inventor built a so-called equality problem circuit with the following function:

$out=bo \rightarrow PutEQGate(s\_alice, s\_bob);$ instead of the call of the greater than equal function in the Boolean circuit class:

$out=bc \rightarrow PutGTGate(s\_alice, s\_bob);$

A new parameter was added to the function $test\_equality\_prob\_circuit$ in order to pass the SAS to the function by parameter, within the $showSAS$ function of the ZRTP. In this system, the MPC has only the function of comparing the SAS and guaranteeing that the SAS exchanged by the protocol is correct.

In terms of the implementation and setup for both of the ZRTPCPP and ABY libraries, there are some necessary changes needed to the published protocols. It is known that both the ZRTP and the MPC protocols use peer-to-peer scenarios. It was therefore necessary to define which ones of the devices 200A or 200B initiates the process (i.e. the sender) and which one is the receiver. The combinations made between the libraries meant therefore that the device 200A or 200B which is the receiver of the ZRTPCPP became party 0 of the MPC, and the other device 200A or 200B, i.e. the sender, became party 1. This is merely a design issue and is not limiting of the invention.

The integration of the ZRTPCPP and ABY libraries was carried out using the cmake platform. In terms of execution, when the ZRTP protocol would have made the SAS display on a screen (which is of course not possible in the implementation described in this document), a new layer of verification of this SAS was added. On the other hand, the ABY framework was to make the verification of the equality of the SAS.

In this implementation, there are two schemes. The first scheme is when the exchanged SAS between the two devices 200A and 200B is equal. In this first case the data can be exchanged securely and privately between the two devices 200A and 200B, as noted above. In the second case, the comparison shows that the exchanged SAS is different. The method and system abort the attempted communication without any exchange of the data or information between the two devices 200A and 200B. It will be assumed that, in this second case, when the SAS is different, there is probably an MitM attack in the communication.

In the following paragraphs, the security of the system is analysed, and some known attacks are described, as well as evaluating the success of the system against these attacks. This analysis is done with respect to a threat model that describes the necessary and sufficient scenarios—all from a hypothetical attacker's point of view.

Threat Model. The ZRTP caches the symmetric keys used to compute the values of the secret session keys, and these computed values change with each session, as discussed above. If someone steals the ZRTP shared secret cache from the memory of one of the devices 200A or 200B, the attacker gets one unique chance to mount an MitM attack in the very next session as it can generate the session key for the next session. This is possible in the method and system. It will be noted that the mode "Without Key Continuity" described above solves this problem, since the session key is generated anew. The ZRTP shared secret cache is always deleted from the memory at the start of each new session and always executes the system and method in DH mode (based on ZRTP Diffie-Hellman mode), as described above. Nevertheless, there is always the necessity of comparing the SAS with the MPC.

It is possible for a collision of the SAS to occur, as discussed above, enabling an MitM, i.e., an honest user can have one SAS key, and the attacker can get or identify the same key and thus intercept the call through an MitM. Sisalem, Dorgham, et al. SIP security. John Wiley & Sons, 2009. However, this attack can be prevented by increasing the size of the SAS to reduce the chance that the attacker generates the same SAS key, as is carried out in this method and was described above. This is performed, as shown in the RFC of ZRTP, by increasing the cipher key size (the AES key) and thus producing the new SAS with a greater size. The increase in the size of the SAS adds greater security regarding the communication cipher and also makes the collision of the SAS harder for an attacker.

In the MPC library stored on the devices 200A and 200B, an adversary can launch an MitM attack, as there is no authentication at all. ABY uses the semi-honest (passive) adversary model, assuming a computationally bounded adversary who tries to learn additional information from the messages seen exchanged during the execution of the method. In contrast to the stronger malicious (active) adversary, the semi-honest adversary is not allowed to deviate from the protocol. The adversaries can explore the malicious (active) adversary model. An active attack means that the attacker interferes with and modifies the normal execution of the protocol. The attacker does not simply observe what happens in the network in a "passive" way.

Attack Scenarios. In this subsection, the security of the proposed solution was measured and the security of the method against different scenarios of attack was determined. This way, the inventors were able to classify the security of the method and system outlined in this document. This security was based on a set of theorems, adapting those used by Afifi et al. to demonstrate that the authentication protocol was secure. To complete the evaluation, the inventors also add two new theorems. Afifi, M. H., et al. "Dynamic Authentication Protocol Using Self-Powered Timers for Passive Internet of Things." IEEE Internet of Things Journal (2017).

Supposition 1. The method is secure against de-synchronisation attacks. The proof is based on the following. The manner to avoid de-synchronisation attacks is shown in FIG. 1 in which a unique identifier is used to store information in the identifier file 220 related to this device 200A or 200B in a database. When one of the devices 200A or 200B sends the message F7 there is an update to the local cache in the memory of the devices 200A or 200B and the secret keys are then rotated in the memory. If, for example, the memory corrupts the information, or another type of problem occurs, both of the devices 200A and 200B will not be capable of negotiating the session key in the pre-shared mode. Both of the devices 200A and 200B will drop to the first stage and a new DH key change in steps F6 and F7 will be performed.

Supposition 2. The method and system outlined in this document is secure against tag impersonation attacks, based on the security provided by the combination of PRNG's and the locally stored secret keys.

Proof. Each of the devices 200A and 200B have a unique identifier—as shown in the FIG. 1 in steps F1 and F3, and which is generated by the PRNG. The unique identifier is used for communication with any other device. Suppose an attacker obtains the identifier for device 200A, then the attacker could attempt to impersonate device 200A and send the device 200A's identifier to the device 200B. The attacker will not be able to do this because, as explained previously, there is the identifier file 220 in the local cache that caches symmetric key material used to compute the session keys for the communications session. It was noted above that the values of the session keys are rotated and therefore change with each communications session. So, when the attacker tries to impersonate the device 200A, it is impossible for the attacker to pass undetected to the device 200B because, when the attacker attempts to generate a new key for the next communication session with the attacked victim, i.e. the other device 200B, the secret keys are not the same as those of the attacker (impersonator of device A), and the device 200B drops therefore the communication. In the first iteration, the attacker will have an authenticated channel for a communication session, but the attacker cannot complete the attack because the validation of the communications session will fail.

Supposition 3. The method and system are also secure against replay attacks. A replay attack is an attack that obtains information from one communication between the two devices 200A and 200B and tries to set the information in a next session or iteration of the communication between the two devices 200A and 200B. For example, if the device 200A is exchanging a file with the device 200B, the attacker can send a piece of the previous file exchanged to try to corrupt the protocol for the communication. To solve this problem, the method and apparatus uses the properties of key continuity and forward secrecy to generate a new session key and make obsolete (i.e. not decipherable) those packets of data and encrypted information exchanged previously. This makes the method secure against replay attacks because, if the attacker performs this type of replay attack, the devices 200A and 200B will just ignore the information sent and continue the ongoing transfer.

The proposed protocol is secure against backward and forward traceability attacks. Traceability can be classified as a passive attack. In this scenario, the only task performed by the attacker is to listen to the exchanged information between the devices 200A and 200B and try to understand patterns that lead to leakage of the information.

The approach adopted to overcome the traceability attack is to use the afore-mentioned Paranoid Mode, in which no local information is stored in the devices 200A or 200B. At any iteration of the communications session, a new identifier for all of the devices 200A and 200B is generated using the PRNG which makes it impossible to reproduce the communication schemes in the attacked session. This makes the method secure against traceability attacks.

The method and system are also resistant to single point of failure. As discussed previously, in the case of PK.I implementations, there is a third party (the certifying authority CA), that checks the validity of the certificates. The CA establishes a link between public keys and identities people or organisations. Therefore, customers in this PK.I implementation have to rely on a third party. The certification authority represents the single point-of-failure, as once the CA is compromised, all of the peers in the network are compromised as well. For example, the Let's Encrypt CA has issued 15,270 "PayPal" certificates to sites used for phishing. A failure in this type of systems compromises several entities. Demmler, Daniel, Thomas Schneider, and Michael Zohner. "ABY-A Framework for Efficient Mixed-Protocol Secure Two-Party Computation." NDSS. 2015.

The system and method of this document, while facing an attack, can only compromise at most one of the devices 200A or 200B, not both of the devices 200A and 200B.

MitM exploit to an attack on the SAS. Martin Petraschek et al. describe the MitM attack on the DH alone and state that, in the ZRTP, the authentication can be made by comparing the SAS with voice recognition, which is mandatory for the first connection and optional otherwise (as it guarantees forward secrecy). However, it is possible that the attacker might try to imitate the voice of one of the parties, and thus deceiving the other party. In this case the MitM attacker simply forwards the RTP packets between the two devices 200A and 200B and can listen into the conversation. Recent studies show that this type of attack is possible. "Lyrebird claims it can recreate any voice using just one minute of sample audio," (2017) (Online; Accessed 25 Apr. 2017). For example, Lyrebird has a set of algorithms that clone anyone's voice by listening to just one minute of audio and this cloning could be used to generate the SAS.

The approach of this document addresses this problem with the additional layer of security with the MPC. This additional layer of security has the goal of creating methods for the parties, i.e. the devices 200A and 200B, to jointly compute a function over their inputs while keeping those inputs private. This way, the comparison of the SAS can be computed without revealing anything to other parties.

However, without identities, the MitM attack cannot be prevented in MPC. See, Pass, Rafael. "Bounded-concurrent secure multi-party computation with a dishonest majority." Proceedings of the thirty-sixth annual ACM symposium on Theory of computing. ACM, 2004. In this method, there is a different approach that can be utilised. The identities of the devices 200A and 200B do not need to be valid because the probability of the attacker intercepting an MPC communication and, at the same time, being able to generate the information exchanged (SAS) equal to that of the other peer is very low.

This can be demonstrated by this example. This can be demonstrated by this example. Let $\alpha$ be the alphabet $\alpha=\{a, b, c, \ldots, z\}$ with a size 26 (for the letters of the Latin alphabet) and $\beta$ be the numbers $\beta=\{0, 1, \ldots, 9\}$ with size 10. $\gamma=\alpha \cup \beta$.

The probability of the generation of the same SAS by one of the devices 200B of the other device 200A is calculated by the permutations with repetitions with the formula: $n^r$. Assuming the default length of the SAS is 4 (four) and the total number of characters ($\gamma=36$), we have n=$\gamma$ and r=4, so, we have $\gamma^4$ possible cases.

Calculating the probability, we have only one possible case for the attacker to generate the same SAS of the other device. In other word, the probability of the same SAS being generated is almost zero.

$$\text{Probability} = \frac{\text{Favourable Outcome}}{\text{Possible Outcome}} = \frac{1}{\gamma^4} = 5.95e^{-7} \approx 0$$

The difference between the method and system outlined in this document, J-PAKE, and ZRTP will now be discussed. We shall start by analysing the type of data that is used by each approach (audio vs. data), and also the security properties Forward Secrecy and Key Continuity. As the focus of the method and system is on the IoT network shown in FIG. 2, a check will be described to see if the approaches are ready for this type of technology and if it is possible to use as automatic provisioning. Finally, an analysis is carried out to see if there are multiple operation modes in the other protocols, as the system and method of this document has operation modes adapted to security or speed, depending of the needs of the user.

Automatic provisioning is a feature in the context of the IoT network because automatic provisions leaves communication security not dependent on the user. In addition, many of the IoT devices in the IoT network do not have keyboards or screens. One source of error is that humans tend to make it easy to provision anything that pops up on a screen. The human user may confirm the SAS, without actually questioning whether the SAS actually matches on both of the devices. Neither the J-PAKE nor the ZRTP system offer safeguards against such human error.

The J-PAKE system requires two screens and a keyboard, at a minimum, because, for each of the devices, it is necessary to enter a key that is displayed on the screen to make the provisioning. A test was made using the Pale Moon Web-Browser, which continues to use J-PAKE as part of its Sync service. In the ZRTP method, human interaction is also needed because audio recognition is necessary to compare and validate the SAS, which requires a display and two buttons, at a minimum.

Both of the J-PAKE and ZRTP protocols are only partially IoT-ready, as both of the protocols require human intervention and, as discussed above, for the IoT network, human intervention is not appropriate.

This following section presents the results of the proposed system in terms of network latency. The experiments were carried out in all implemented modes described above, i.e. without key continuity; in normal mode; and, finally, in paranoid mode. These modes differ in terms of usage and complexity, as the MPC is not required in all iterations given the key continuity. On the other hand, in some cases, it may be important to validate the SAS at every iteration of the communications session to ensure that the communication between any two of the devices 200A and 200B is always secure.

The run time of the system and method versus the OpenSSL PKI system was also tested. In the PKI systems, the trust is constructed based on Public Key Certificates, as discussed above.

The latency was measured over the network in the systems. Clock or chrono timers are used to measure the time that it takes to complete a particular action. In this case, the communication between the device being a server (receiver) and the device being a client (sender). If the client sends data to the server and waits for a reply, then the overall duration can be measured, which should roughly estimate the Round-Trip Delay time (RTD) between the client and server. The goal was to measure the provision time of the system and method of this document compared to the PK.I-based system. The running time of the system and method with and without the MPC was also measured to assess the real order of magnitude of extra delay due to the MPC and its contribution to the overall latency.

This experimental section is divided into three parts. The first part consists of the setup and configuration of the system for the experiments, i.e., the devices that are used for the experiments, as well as the operating systems for the devices. Then, the results of the different modes implemented are presented, as well as a discussion on the results. Finally, a comparison of the results of the system and method of this document with those of the PKI-based system are disclosed.

In order to measure the results of the usage of this system in a realistic environment (low-resource devices), the experiments were performed using two common off-the-shelf Raspberry Pi 3 Model Bs running Canonical's Ubuntu Core, a specialised operating system for the IoT.

Figure 3:
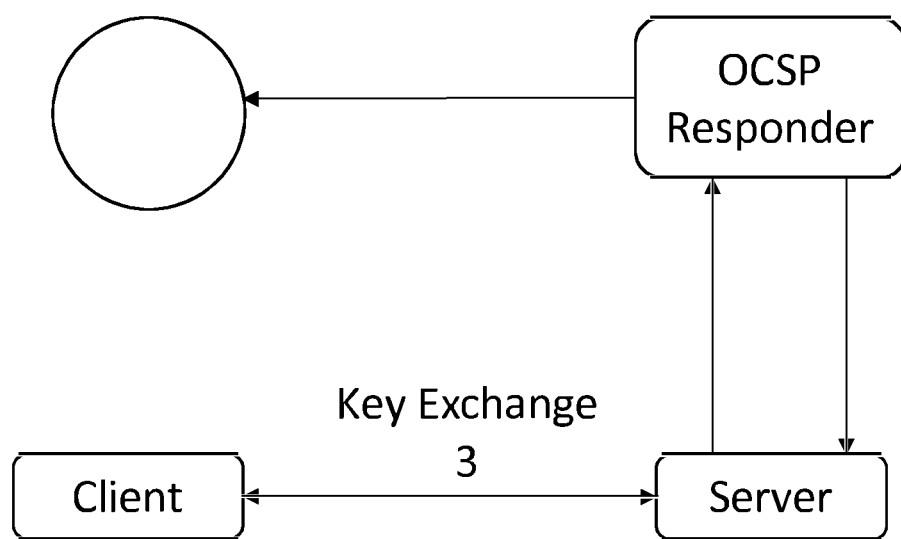
FIG. 3 shows a connection of two devices being Raspberry Pi processors.

The IoT network emerges from the interconnection of a plurality of devices. The environment as shown in FIG. 2 was created. The two Raspberry Pi Bs are the devices 200A and 200B are connected over the network 202 (i.e. the Internet). One of the Raspberry Pis 200A is connected to the Internet using a wireless link 204, through a wireless router (ASUS RT-AC3200) 205, and the other one of the Raspberry Pis 200B is connected to the Internet 202 using a wired Ethernet link 203. It was decided to route the traffic through the Internet 202 to measure execution time with network latency in a realistic scenario In order to evaluate the method of this document, the provisioning times in all three modes was measured. FIG. 3 depicts the scenario to be evaluated, representing the provisioning phrase.

To perform these measurements, the gettimeofday( ) system call was, using the setup shown in FIG. 2. The results are given in the table below. For each mode, represented in Table III, and the corresponding iteration from 1 up to 10, these values are the average values after 10 repetitions and the correspondent standard deviation of the average.

| Modes | Iterations | Without MPC (ms) | With MPC (ms) | Method |
|---|---|---|---|---|
| Without KC | 1-10 | 290 ± 2.27 | 9552 ± 9.36 | 9843 ± 50.49 |
| Normal | 1 | 288 ± 2.27 | 9457 ± 49.36 | 9745 ± 50.49 |
|  | 2-9 | 283 ± 1.78 | — | 283 ± 46.92 |
|  | 10 | 287 ± 1.78 | 9495 ± 45.28 | 9783 ± 46.92 |
| Paranoid | 1-10 | 291 ± 2.27 | 9506 ± 49.36 | 9798± |

The "Without Key Continuity" mode does not require any extra storage in the identifier file 200 in the devices 200A and 200B because it is not necessary to store the previously exchanged keys. This "Without Key Continuity" mode was determined to take an average time of approximately 9843 ms±50.49 in all iterations. This Without Key Continuity" mode has some advantages regarding security, as the mode never relies on previously exchanged keys and has key continuity, and also reduces storage requirements. However, the running time is the highest of the three modes.

The "normal" mode, unlike the previous "Without Key Continuity" mode, uses the concept of key continuity, as explained above. As such, the normal mode requires extra storage for the key in the devices 200A and 200B. However, as noted above, the MPC module 210 is used only every 10 iterations (for example). In this case, the running time is 283 ms+46.92 after the first iteration. In the first iteration, given the overhead of the MPC, the latency is 9745 ms±50.49. As we use MPC at every 10 iterations, this results in a latency spike.

The "paranoid" mode is similar to the "normal" mode, as the paranoid mode also makes use of key continuity. However, this mode is "paranoid" to the point of always verifying the SAS through the MPC module 210 in all of the iterations, and thus not relying on key continuity.

In terms of latency, there is no difference between the "Without Key Continuity" modes and the paranoid modes. Only the normal mode has a significant lower latency when compared to the other two modes. This normal mode runs the MPC module 210 every 10 iterations. All of the other iterations have a similar behaviour. On the upside, the average running time for the remaining iterations is 283±46.92 ms.

In this normal mode, the main drawback is the additional storage is required in the devices 200A and 200B. The implicit trade-off is between storage and latency.

In brief, the choice between the operation modes is dependent on the type of devices 200A and 200B that are used, the communication links between the devices 200A and 200B, and, ultimately, the functional requirements of the user of the IoT network.

As an authenticated channel is assumed, we added a time factor 8 to the runtime to represent the overhead associated with it. However, we assume that this time factor 8 will represent more than 20% of the runtime.

FIG. 3 shows the PK.I scenario to be evaluated. In this FIG. 3 is shown a local client, represented by a local Raspberry Pi, and a server machine hosted in a remote Raspberry Pi (illustrated in the FIG. 2) provisioned with DigiCert certificates. The remote certificates support the OCSP stapling that removes the complexity of the devices communicating with the CA. The TLS server periodically questions the OCSP responder about the validity of its own certificate and caches the response. The OCSP responder returns an OCSP response, which is (directly or indirectly) signed by the CA that issued the certificates. The TLS client can treat this stapled OCSP response in the same way, i.e., the certificate should only be used if it has a valid timestamp and signature.

During the TLS handshake, the client announces support for OCSP stapling to the server. In turn, the server activates the Certificate Status flag if the server has supports for the Certificate Status Flag. This process is shown in step 1 in FIG. 3. During step 2, an SSL connection is established between the devices A and B. The goal is to measure the certificate's OCSP (state) check latency on top of the latency added by SSL connection handshake.

To measure the latency of this scenario, s_client and s_server binaries from the OpenSSL library were used. The s_server service was run on the server machine and the s_client run on the local machine. It was possible obtain both the OCSP information and server/client handshake results. It was found that there was an average running time of 380 ms±1 1.60 across the 10 iterations.

The system and method of this document running in the "normal" mode achieves therefore a latency reduction of 26% compared to the results using PK.I-based systems.

This document describes a novel solution for the provisioning of and lightweight communication between the IoT devices in the IoT network that makes use of a modified secure key exchange protocol, in which the audio channel was replaced with data negotiation over MPC (KEAV). Three distinct operational modes, with increasing levels of security scrutiny and overhead are defined. The IoT network can be used for multiple fixed sensors, but also could be used in a network for autonomous driving.

The disrupting problem of scalability and small-footprint devices, which must be addressed in the IoT market, should consider the "normal" mode as a solution for this environment. This mechanism, alone, is capable of performing authentication and attestation of security properties in the small IoT devices, without a large impact on CPU's or battery consumption. The local information stored can be redesigned, allowing, for example, for these modes to be used in the most frequently used communication schemes, leaving the other modes for when there is a need for sporadic communication. This would allow, for example, the detection of new systems over the IoT network that come to replace old devices.

In another application of the system and method, the devices could be VoIP.

The work of Patricia R. Sousa, JoAo S. Resende and Rolando Martins was supported by a scholarship from the Fundagoo para a Cincia e Tecnologia (FCT), Portugal (scholarship numbers, SFRH/BD/135696/2018, PD/BD/128149/2016, SFRH/BPD/115408/2016.

This work of Luis Antunes was supported by Project "NanoSTIMA: Macro-to-Nano Human Sensing: Towards Integrated Multimodal Health Monitoring and Analytics/NORTE-01-0145-FEDER-000016", financed by the North Portugal Regional Operational Programme (NORTE 2020), under the PORTUGAL 2020 Partnership Agreement, and through the European Regional Development Fund (ERDF).

What is claimed is:

1. An IoT network for establishing a peer-to-peer communication along a communications channel between a plurality of devices, wherein the plurality of devices comprise:
   a transmitter for transmitting messages along the communications channel to one or more of the other ones of the plurality of devices;
   a receiver for receiving messages from the communications channel from one or more of the other ones of the plurality of devices; and
   an identifier file for storing secret session keys computed using symmetric keys for the communications channel between one or more of the other ones of the plurality of devices;
   wherein a first device of the plurality of devices comprises a first processor and a first multi-party computation (MPC) module in said first processor, and a second device of the plurality of devices comprises a second processor and a second multi-party computation (MPC) module in said second processor;
   the first device is adapted to calculate from the secret session keys a first authentication string (SAS) being a sequence of letters and numbers, and the second device is adapted to calculate from the secret session keys a second authentication string (SAS) being a sequence of letters and numbers, wherein the first device is adapted to receive the second authentication string (SAS) from the second device and the second device is adapted to receive the first authentication string from the first device;
      the first multi-party computation (MPC) module in the first device is adapted to automatically validate the second SAS by comparing the second SAS with another SAS generated in the first device;
      the second multi-party computation (MPC) module in the second device is adapted to automatically validate the first SAS by comparing the first SAS with another SAS generated in the first device, wherein the first multi-party computation (MPC) module and the second multi-party computation (MPC) module are configured to confirm the security of the communications channel; and
   a communications channel between the first device and the second device is configured to exchange the messages between the first device and the second device.

2. The network of claim 1, wherein the plurality of devices further comprises a storage for storing a plurality of secret session keys.

3. The network of claim 1, wherein the plurality of devices further comprises a pseudo random number generator for generating an identifier for identifying the devices.

4. The network of claim 1 further comprising a server for providing one of the plurality of devices with an identifier of another one of the plurality of devices.

5. The network of claim 4, wherein the server is adapted to carry out a mutual discovery of one of the plurality of devices with another one of the plurality of devices by exchanging the identifiers between the plurality of devices.

6. The network of claim 1, wherein the multi-party computation (MPC) module is adapted to implement an equality function between the first SAS in one of the plurality of devices and a second SAS in one of the plurality of devices.

7. The network of claim 6, wherein the equality function is adapted to compare a first input value t1 from one of the plurality of devices with a second input value t2 of another one of the plurality of devices.

8. The network of claim 7, wherein the multi-party computation (MPC) module is adapted to return a value S=1 and thereby confirm the security of the communications channel if the first input value t1 is equal to the second input value t2.

9. The network of claim 7, wherein the multi-party computation (MPC) module is adapted to return the value S=0 if the first input value t1 is not equal to the second input value t2.

10. The network of claim 5, wherein the multi-party computation (MPC) module is adapted to implement the equality function after every N connection established between the first SAS in one of the plurality of devices and a second SAS in one of the plurality of devices.

11. The network of claim 1, wherein the plurality of devices are sensor devices and/or VOIP devices.

* * * * *